Patented Apr. 23, 1946

2,398,820

UNITED STATES PATENT OFFICE 2,398,820

PRODUCTION OF VINYL ESTERS

Philip Dalton Coppock, Epsom Downs, and David James Hadley, Banstead, England, assignors to The Distillers Company Limited, Edinburgh, Scotland, a company of Great Britain No Drawing. Application January 3, 1944, Serial No. 516,857. In Great Britain August 6, 1942

14 Claims. (Cl. 260—498)

This invention is for improvements in or relating to the production of vinyl esters of organic acids and is particularly but not exclusively applicable to the catalytic production of vinyl acetate by the interaction of acetylene and acetic acid in the vapour phase.

It is well known that in this reaction zinc acetate and other zinc compounds supported on active carbon catalyze the reaction between acetylene and acetic acid. We have found, however, that such a catalyst continuously loses its activity during use and that frequent replacement or regeneration is necessary at short intervals of time.

According to the present invention, a vinyl ester of an organic acid is produced by reacting acetylene with the appropriate organic acid in the vapour phase and at an elevated temperature in the presence of a catalyst consisting of a compound of zinc or cadmium supported on Activated Alumina. The alumina is preferably in the form of granules to provide a large surface of active catalyst.

By using the method of the invention we find that the catalyst retains its activity undiminished for a considerable period of time. The zinc or cadmium compound used for impregnating the catalyst support may consist either of the oxide, the acetate, or other salt.

It has previously been known, in the production of vinyl acetate, to recirculate the gaseous products of reaction, after the vinyl acetate has been removed by cooling, over the catalyst together with fresh acetylene and acetic acid. When using compounds of zinc or cadmium supported on Activated Alumina, we have found that small quantities of carbon dioxide and smaller amounts of other gases are produced by side reactions and the rate of production of vinyl acetate gradually diminishes as these gases accumulate in the system. Therefore, in order to maintain a reasonably steady rate of production of vinyl acetate, it is advisable to remove the bulk of the gaseous by-products from time to time from the system. This may be carried out either by simply venting the normally gaseous products of reaction from time to time or by scrubbing the gaseous products with a suitable medium before recirculating over the catalyst. As carbon dioxide forms the main bulk of these by-product gases, this can be absorbed in water or an alkaline solution, e. g. 10% aqueous sodium hydroxide solution. As, however, the remaining gases are not readily removed by a scrubbing process of this type, we prefer to vent the gaseous products from time to time.

A preferred method of forming the supported catalyst consists in heating the Activated Alumina in granular form to a temperature above 100° C. and below 500° C. and, while still at this temperature, saturating it with a boiling aqueous solution of zinc acetate or cadmium acetate. In the case of zinc acetate, a boiling solution containing about 50% by weight of the crystalline salt is suitable.

This operation can conveniently be carried out in a heated mixer fitted with rotating stirrers which continuously expose fresh surfaces of the Activated Alumina whilst the boiling solution of zinc or cadmium acetate is being added. If the catalyst is prepared by treating Activated Alumina with hot zinc acetate solution at a temperature below 100° C., a less active catalyst is obtained. We have found, for example, that using a catalyst, prepared by impregnating activated alumina at 200° C., with an acetylene circulation of 200 litres per hour and a molecular ratio of acetylene to acetic acid of 4.5:1, and a temperature control bath at 210° C. an acetylene absorption of 40 litres per hour per unit of catalyst (as hereinafter defined) was obtained: under similar conditions, but using a catalyst impregnated at a temperature below 100° C. the rate of absorption of acetylene was only 30 litres per hour.

In order to obtain a catalyst of maximum activity, the amount of aqueous zinc or cadmium salt solution employed should not greatly exceed the amount that can be absorbed by the alumina, as any considerable excess of solution tends to reduce the activity of the catalyst produced.

The supported catalyst is subsequently dried before use, preferably at a temperature below 100° C.

The following example shows one method of preparing the catalyst:

Example 1

800 gms. of Activated Alumina of 4–8 mesh was heated for 12 hours at 200° C. and it was placed in a gas-heated mixer of the type previously described, also heated to 200° C.

A boiling solution made from 345 gms. of crystalline zinc acetate $(Zn(CH_3.COO)_2.2H_2O)$ and 345 gms. of distilled water was then sprinkled on to the alumina which was continuously stirred by the blades of the mixer, the heating of the mixer being discontinued during addition of the zinc acetate solution. The resulting impregnated alumina was then carefully dried at 98° C. for a period of 12 hours. When packed into the reaction tube, the catalyst has a packing density of approximately 1. The quantity of supported catalyst obtained in this way, using 800 gms. of Activated Alumina, has been employed as the basis of experimental work and the term "unit of catalyst" refers to this quantity.

We prefer to carry out the reaction using a gas mixture containing an excess of acetylene. The molar ratio of acetylene to acetic acid in the gases entering the reaction vessel may, however, be varied according to the reaction conditions employed. As the reaction between acetylene and acetic acid is exothermic, the heat produced being approximately 28 kgs. calories per gm. mol., temperature gradients throughout the catalyst are inevitable. For this reason we prefer to carry out the reaction in a reaction tube surrounded by a suitable liquid heating bath, as we find that an electrically-heated tube can only be employed satisfactorily at low rates of production of vinyl acetate. The use of a liquid bath has thus facilitated the production of vinyl acetate at a rate considerably in excess of that possible in an electrically-heated tube without rapidly impairing the activity of the catalyst. The bath medium may consist of any liquid of suitably high boiling point maintained at the desired temperature e. g. by thermostatic control. We prefer, however, to use a liquid or liquid mixture which boils at the required temperature: the vapours evolved being condensed and returned to the bottom of the bath.

Furthermore, we have found that even when a liquid temperature control bath is employed there is an optimum rate of production of vinyl acetate. For instance, using a 2" internal diameter tube and an initial bath temperature of 200–212° C. it is advisable to control the reaction so that the rate of absorption of acetylene does not greatly exceed 40 litres per hour per unit of catalyst. At this rate of absorption, the maximum and minimum temperatures throughout the catalyst do not differ by more than about 6° C., whereas at an absorption rate of 50 litres per hour, the difference may be as high as 25° C. which results in a fairly rapid decline in catalyst activity.

The optimum absorption rate of about 40 litres per hour per unit of catalyst for a 2" tube may be achieved in a number of ways. It is not advantageous to increase the acetylene circulation rate above 200 litres per hour per unit of catalyst as, at these higher rates, not only is the power required for pumping considerably increased, but also more acetic acid is required to give the same output of vinyl acetate. The preferred conditions for a 2" internal diameter tube are shown in the following table:

| Initial catalyst bath temp., °C. | Acetylene circulation rate | Molar ratio of acetylene to acetic acid |
|---|---|---|
| | Litres/hr. | |
| 200–212 | 200 | 4.5 |
| 200–212 | 100 | 2.0 |

The activity of the catalyst decreases gradually with time, but the rate of production of vinyl acetate may be maintained substantially constant by raising the temperature of the liquid bath. We have found it convenient to raise the bath temperature approximately 5° C. each time the rate of acetylene absorption has fallen to 75% of the initial rate of absorption. It is considered that the useful life of a catalyst has been ended when a rise in bath temperature produced only a transitory improvement in acetylene absorption lasting only 3–4 hours.

Example II

The catalyst tube, 2" in diameter (internal), was charged with the catalyst prepared in Example I. The temperature control bath consisted of a mixture of xylene and light mineral oil the boiling point of which could be adjusted by the addition of xylene or the removal of condensate from the solution. The rate of acetylene circulation in Run 1 was 200 litres per hour and the molar ratio of the acetylene to the acetic acid passed into the reaction vessel was 4.5. These conditions gave an initial absorption of 40 litres per hour per unit of catalyst. As the catalyst activity gradually declined the temperature of the bath was raised stepwise in order to maintain the rate of absorption between 30 and 40 litres per hour.

In Run 2, using a similar catalyst, the molar ratio of acetylene to acetic acid was 3:1 with an acetylene flow of 200 litres per hour. This gave an initial absorption of 50 litres per hour. The temperature of the bath was raised as previously described to maintain the absorption between 30 and 50 litres per hour.

The results obtained were:

| | Run 1 | Run 2 |
|---|---|---|
| Temperature range of bath °C | 210–240 | 215–260 |
| Time of run hours | 651.5 | 332 |
| Vinyl acetate produced gms./hr. | 105 | 118 |
| Weight of vinyl acetate in grams produced per unit of catalyst | 85.5 | 48.8 |
| Acetic acid converted to vinyl acetate percent by weight | 62 | 49 |

Since the time of run indicates the useful life of the catalyst, it will be seen that by maintaining a rate of acetylene absorption of 30 to 40 litres per hour, the life of the catalyst is almost 100% longer than is the case when the rate of absorption is 30–50 litres per hour.

Of the acetylene absorbed, about 5% is converted into acetaldehyde. Ethylidene diacetate production is negligible.

Example III

A catalyst was prepared in the same way as in Example I, except that 345 gms. of crystalline cadmium acetate was employed in place of the zinc acetate. This catalyst was found to be slightly more reactive than the zince acetate catalyst described in Example I for the production of vinyl acetate and gave an absorption of 40 litres per hour per unit of catalyst at a bath temperature of 200° C. No perceptible decrease in activity was observed after 30 hours running.

We have found that zinc catalysts supported on Activated Alumina show a much higher efficiency than zinc catalysts supported on active carbon. Thus, with an Activated Alumina-supported catalyst, efficiencies of 90% may readily be obtained (i. e. for every 100 vols. of acetylene a yield of vinyl acetate corresponding to 90 vols. is obtained), whilst in the case of an activated carbon-supported catalyst, the maximum efficiency is of the order of 70–80%. This last result can, in any case, only be obtained at very low rates of conversion. Further, the quantity of vinyl acetate obtained per kilo of activated carbon (treated with 262 gms. of zinc acetate) was 45.8 kilos, whilst with an Activated Alumina-supported catalyst (431 gms. of zinc acetate per kilo alumina) 85.5 kilos of vinyl acetate were obtained. Further, 105 gms. of vinyl acetate were obtained per hr./per unit of catalyst in the case of the Activated Alumina-supported catalyst, whilst only 64 gms. was obtained in the case of the active carbon-supported catalyst.

What we claim is:

1. A process for the production of vinyl acetate which comprises reacting acetylene with acetic acid in the vapour phase at an elevated temperature in the presence of compounds of the group consisting of zinc and cadmium supported on Activated Alumina.

2. A process according to claim 1 wherein the reaction product is recycled with the addition of fresh acetylene and fresh acetic acid.

3. A process according to claim 1 wherein the normally gaseous reaction products are vented from the cycle from time to time.

4. A process according to claim 1 wherein an acetate is used selected from the group consisting of the acetates of zinc and cadmium.

5. A process according to claim 1 wherein an excess of acetylene is used.

6. A process according to claim 1 wherein the molar ratio of acetylene to acid is between 2 and 4.5 to 1.

7. A process according to claim 1 wherein the reaction is carried out in a tubular reactor immersed in a liquid bath maintained at regulated temperatures.

8. A process according to claim 11 wherein the reaction temperature is increased as the rate of acetylene absorption falls.

9. A process according to claim 11 wherein the reaction temperature is increased by 5° C. each time the rate of absorption of acetylene falls to 75% of its original value.

10. A process according to claim 1 wherein the reaction is controlled so that the rate of acetylene absorption in a 2" internal diameter tube packed with 800 grams of Activated Alumina is maintained at 30 to 40 litres per hour.

11. A process for the production of vinyl acetate which comprises passing a gaseous mixture of acetylene and acetic acid over Activated Alumina impregnated with an acetate of the group consisting of zinc and cadmium maintained at a regulated temperature between 200° and 260° C.

12. The process for the production of vinyl acetate which comprises passing a gaseous mixture of acetylene and acetic acid over Activated Alumina impregnated with zinc acetate and maintained at a regulated temperature between 200° and 260° C.

13. The process for the production of vinyl acetate which comprises passing a gaseous mixture of acetylene and acetic acid over Activated Alumina impregnated with cadmium acetate and maintained at a regulated temperature between 200° and 250° C.

14. The process for the production of vinyl acetate which comprises passing a gaseous mixture of acetylene and acetic acid in the approximate ratio of 4.5 to 1, over Activated Alumina impregnated with an acetate selected from the group consisting of the acetates of zinc and cadmium at an initial temperature of 200° C. and increasing the temperature in steps of five degrees whenever the rate of absorption of the acetylene drops below 75% of the initial rate.

PHILIP DALTON COPPOCK.
DAVID JAMES HADLEY.